United States Patent [19]
Puetz

[11] Patent Number: 5,734,776
[45] Date of Patent: Mar. 31, 1998

[54] OUTSIDE PLANT CROSS-CONNECT APPARATUS

[75] Inventor: Curtis L. Puetz, Apple Valley, Minn.

[73] Assignee: ADC Telecommunications, Inc., Minneapolis, Minn.

[21] Appl. No.: 704,260

[22] Filed: Aug. 28, 1996

[51] Int. Cl.$^6$ ................................................ G02B 6/00
[52] U.S. Cl. ................................... 385/134; 385/135
[58] Field of Search ............................ 385/134–137

[56] References Cited

U.S. PATENT DOCUMENTS

| | | | |
|---|---|---|---|
| 4,776,662 | 10/1988 | Valleix | 385/135 |
| 5,289,558 | 2/1994 | Teichler et al. | 385/135 |
| 5,363,466 | 11/1994 | Milanowski et al. | 385/135 |

OTHER PUBLICATIONS

Raychem Corporation document dated 1995, 1996 H53369 (F262) Feb. 1996 entitled "FOSC 400 Fiber Optics Splice Closures".

Molex Fiber Optics Publication 1996 (no month avail).

*Primary Examiner*—Rodney B. Bovernick
*Assistant Examiner*—Hemang Sanghavi
*Attorney, Agent, or Firm*—Merchant, Gould, Smith, Edell, Welter & Schmidt, P.A.

[57] ABSTRACT

A cross-connect apparatus is sized to be contained within an enclosure for outside plant applications. The cross-connect apparatus includes two connector panels hinged to a support structure to pivot between opened and closed positions. In the closed positions, the panels are sized to be received within the enclosure device. Each of the panels contains a plurality of adapters for securing to connectors on both exterior and interior surfaces of the panels.

19 Claims, 4 Drawing Sheets

5,734,776

1

OUTSIDE PLANT CROSS-CONNECT APPARATUS

BACKGROUND OF THE INVENTION

1. Field of the Invention

This invention pertains to enclosure devices for housing fiber optic telecommunications equipment. More particularly, this invention pertains to such an enclosure device for housing cross-connect and splice equipment for fiber optic telecommunication systems.

2. Description of Prior Art

With the increased use of fiber optic technology in telecommunications, an apparatus must be developed to permit access, cross-connect functions and splice functions of fiber optic cables in the field. For example, it is desirable to have access to fiber optic cables in outdoor locations such as in manholes or the like.

In order to protect fiber optic connections from the environment and from damage due to impact or vandalism, such equipment is housed in enclosures which may be buried or placed in underground vaults. Examples of such enclosures are fiber optic splice closures sold by the Raychem Corporation, Telecommunications Division of Fuquay-Varina North Carolina. A particular such device of Raychem Corp. is identified as Raychem product number FOSC 400 D5 Closure. Such enclosures have a wide acceptance in the telecommunications industry. Such an enclosure includes a generally circular base member having access ports for passing bundles of fiber optic cables through the access ports. A cover is releasably secured to the base member. The cover is generally cylindrical with an open axial face which is secured to the circular base. In previously sold FOSC 400 D5 Closures, cable splices in splice trays were mounted on the base. To have access to the splice trays, the cylindrical cover would be disconnected from the circular base and the cover could be lifted off over the splice trays to expose the splice trays for access by a technician.

Another prior art enclosure is a high density fiber cross-connect enclosure for outdoor installation sold by Molex Fiber Optics. This device includes a plurality of hinged doors mounted on a circular base. A generally cylindrical cover is secured to the base such that the cover can be removed to permit access to the doors. The hinged doors carry fiber optic adapters.

It is desirable to increase the function capabilities of such enclosures to permit both splice, excess fiber take-up and cross-connect functions within a single enclosure. It is further desirable to provide cross-connect functions within such an enclosure which permit access to fibers while preventing potential damage to fibers due to movement of parts. Particularly, it is desirable to provide such additional functionality within popular sized enclosures such as the aforementioned FOSC 400 D5 Closure of Raychem Corporation since such closures are widely available within the field today for retrofit applications and, in many telecommunications companies, have been accepted as standard for outside plant applications.

SUMMARY OF THE INVENTION

According to a preferred embodiment of the present invention, a cross-connect apparatus is disclosed for mounting in an enclosure having a base and a cover removably secured to the base. The cross-connect apparatus includes a base support which is secured to the base of the enclosure. A first connector panel is connected to the base support to pivot relative to the base support about an axis which is generally parallel to a longitudinal dimension of the enclosure cover. Similarly, a second connector panel is secured to the base support to be pivoted about an axis which is also generally parallel to the longitudinal dimension of the enclosure cover. Each of the first and second connector panels are secured to the base support with interior surfaces of the panels opposing one another. The first and second connector panels pivot independent of one another between open and closed positions. A plurality of fiber optic adapters are secured to each of the panels for movement with the panels. A first plurality of fiber optic connectors with attached fibers are secured to individual ones of the adapters on the interior surfaces of the panels. A second plurality of fiber optic connectors with attached fibers are secured to individual ones of the adapters on the exterior surfaces of the panels. The base support and the panels are sized to be completely received in the cover with the base support secured to the base of the enclosure and with the exterior surfaces of the panels spaced from internal surfaces of the cover by a distance greater than an extension of the second plurality of fibers and connectors from the exterior surface of the panels.

DESCRIPTION OF THE PREFERRED EMBODIMENT

Referring now to the several drawing figures in which identical elements are identically numbered throughout, a description of the preferred embodiment will now be provided. In a preferred embodiment, the present apparatus is a device to be placed within a prior art fiber optic splice enclosure and preferably to be placed within a FOSC 400 D5 Closure as sold by Raychem Corporation and as described in Raychem Corporation publication H53369 (F262) February 1996 entitled "FOSC 400 Fiber Optics Splice Closures," incorporated herein by reference. Such an enclosure includes a generally circular base having a plurality of ports formed through the base to provide access to admit fiber optic cables from an exterior of the enclosure through the base and into an interior of the closure. The enclosure further includes a generally cylindrical cover with one axial face of the cover being closed and with an opposite axial face being open. The open axial face is secured to the base by a releasable sealing ring. As a result, the cylindrical cover extends from the circular base along a longitudinal dimension of the cover. Typically, the cover has an internal diameter of about 10 inches.

Figure 1:
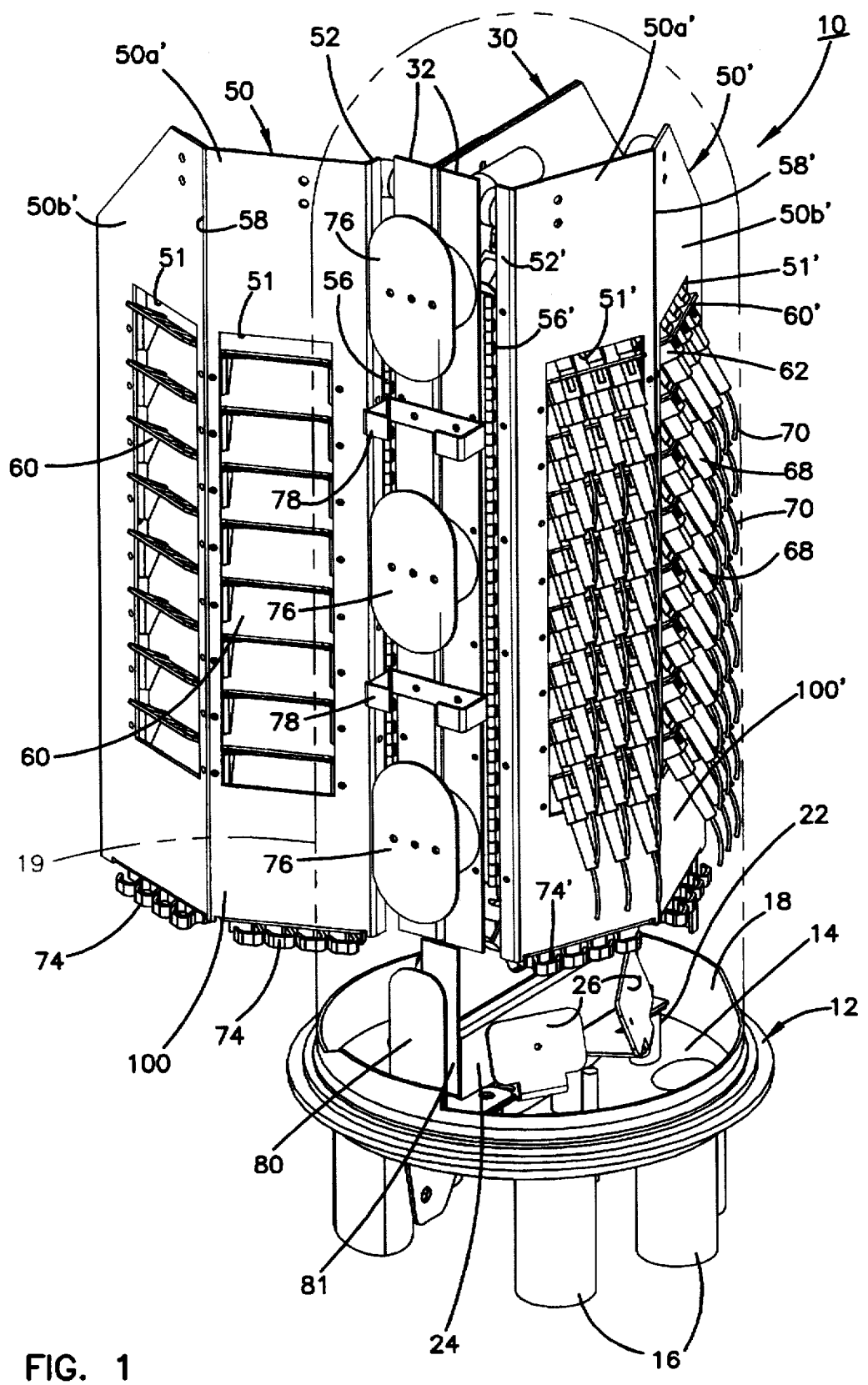
FIG. 1 is a front, top, and right side perspective view of a cross-connect apparatus according to the present invention secured to a prior art enclosure base and with an enclosure cover removed and with a left panel shown in a closed position and a right panel shown in an open position.
Figure 2:
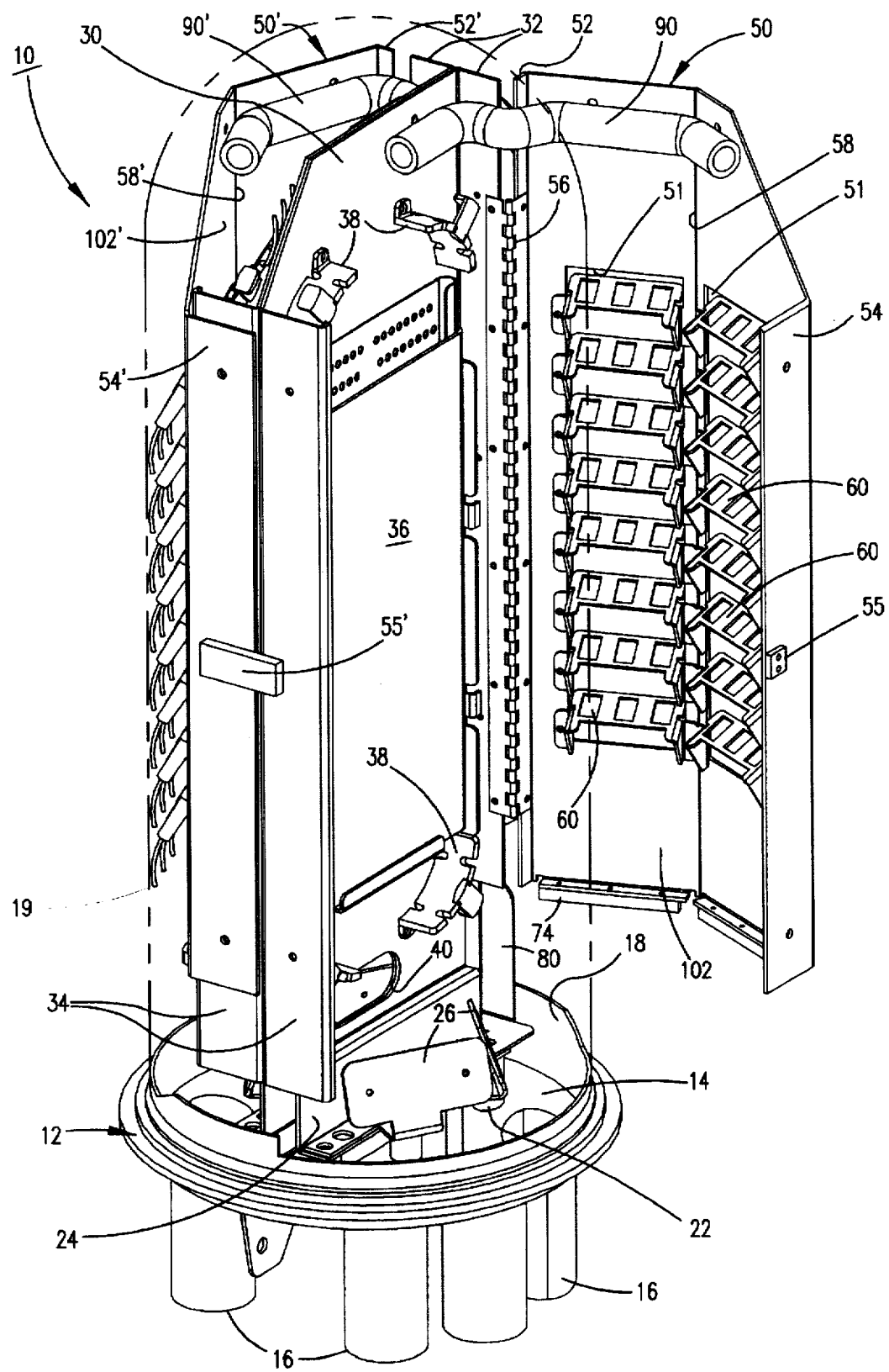
FIG. 2 is a rear, top, and left side perspective view of the apparatus of FIG. 1.

With reference to the drawing figures, FIG. 1 illustrates a cross-connect and splice apparatus 10 secured to a base 12 of a prior art enclosure such as the Raychem FOSC 400 D5 Closure. The base 12 includes a generally circular support platform 14 having a plurality of ports 16 to permit passage of fiber optic cables from the exterior into the interior of the closure. A cylindrical wall 18 extends upwardly away from the platform 14. The wall 18 has a diameter of about 10 inches and is equal to the diameter of a cylindrical cover to be attached to the closure. For purpose of clarity, the cover 19 is shown only in phantom lines in FIG. 2 only. The cover is attached to the base 12 by means of a snap ring (not shown) received on a protruding flange 20 of the base. The base 12 includes a plurality of support posts 22 on which an apparatus may be secured to the base 12. It will appreciated that a base such as base 12 forms no part of this invention per se and is identical to that of the prior art FOSC 400 D5 Closure. Further, it will be appreciated that the cover to be secured to the base forms no part of this invention per se and in a preferred embodiment is identical to that shown and used in the FOSC 400 D5 Closure.

The apparatus 10 includes a base support 24 secured to the support posts 22 to rigidly and fixedly secure the base support 24 to the enclosure base 12. A plurality of clip platforms 26 are secured to the base support 24 and aligned with the ports 16. The clip platforms 26 provide a rigid base against which cables may be clamped to secure incoming cables. It will be appreciated that clamping fiber optic cables forms no part of this invention per se and that such clamp platforms are preferably electrically conductive to electrically ground with fiber optic cables which may be provided with an electrically conductive shield.

Extending upwardly from the support 24 in a direction parallel with the longitudinal dimension of the cover to be received with on the base 12, the apparatus 10 includes a generally planar splice tray support 30. The splice tray support 30 is a sheet metal face terminating at flanged ends 32, 34. The splice tray support 30 extends across the diameter of the base 12 to be centrally positioned on the base 12. The splice tray support 30 defines a dividing plane between a left and right side of the apparatus. The splice tray support 30 houses and retains conventional splice trays 36 on opposite sides of the support 30 for purposes that will become apparent. An access hole 40 is formed at the lower end of the splice tray support 30 to permit fibers or cables of the like to be passed from one side of the support 30 to the opposite side.

Figure 3:
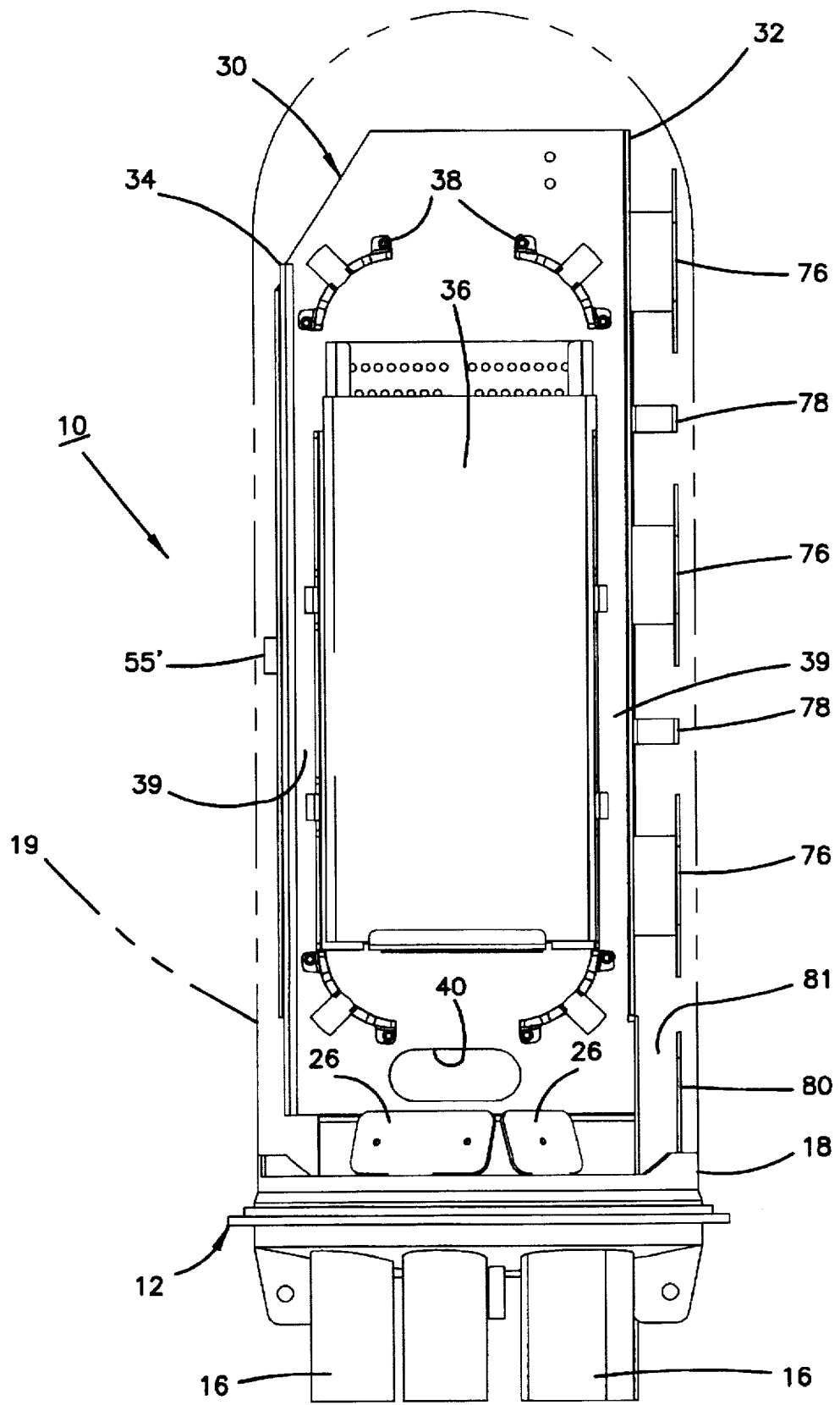
FIG. 3 is a side elevation view of the apparatus of FIG. 1 with a connector panel removed to expose an interior splice tray.

The support 30 carries a plurality of arcuate fiber guides 38 positioned on the corners of a rectangle surrounding the splice trays 36. The fiber guides 38 together with opposing walls of the flanged ends 32, 34 define cable pathways 39 (FIG. 3) surrounding the splice trays 36. Therefore, excess lengths of fiber can be wrapped around the guides 38 and passed through the pathways 39 to take-up excess lengths of fiber while preventing excessive bending of the optical fibers.

The apparatus 10 includes first and second connector panels 50, 50'. The panels 50, 50' extend from first ends 52, 52' to second ends 54, 54'. The first ends 52, 52' are pivotally secured to the flange 32 by a hinge 56, 56'. The hinges 56, 56' extend parallel to one another to define pivot axes which are generally parallel to the longitudinal dimension of the closure.

As shown, each of the panels 50, 50' is bent at a dividing line 58, 58' into a first field 50a, 50a' and a second field 50b, 50b'. The second ends 54, 54' are provided with mating latches 55, 55' such that the ends 54, 54' may be secured together when the panels 50, 50' are moved to a closed position (as shown with respect to panel 50'). The panels 50, 50' are further rotatable to an open position as shown with respect to panel 50 to permit access to a splice tray 36 opposing the panel 50. Accordingly, the panels 50, 50' may be pivoted about 90° from the closed position shown with respect to panel 50' to a fully opened position. The panels 50, 50' have exterior 100, 100' and interior 102, 102' surfaces. The exterior surfaces 100, 100' only are accessible when the panels 50, 50' are in the closed position. The interior surfaces 102, 102' are accessible when the panels 50, 50' are in the opened position. Further, when the panels 50, 50' are in the closed position, the splice trays 36, 36' and any fibers contained within the pathways 39 around the guides 38 are inaccessible.

Each of the fields 50a, 50b has a generally rectangular shaped cutout 51 formed through the sheet metal of the panels 50, 50'. A plurality of angled retainer brackets 60 are positioned within openings 51.

A plurality of fiber optic adapters 62 are secured to the brackets 60. For purposes of clarity, adapters 62 are only shown secured onto panel 50' and not on panel 50. It will be appreciated that, in use, such adapters 62 would be secured to both panels 50, 50'. Each of the adapters 62 can be secured to a first plurality of fiber optic connectors 64 with attached fibers 66 on an interior surface 102, 102' of the panels. A second plurality of fiber optic connectors 68 with attached fibers 70 may be attached to the adapters 62 on the opposite or exterior side 100, 100' of the panels 50, 50'. For reasons that will become apparent, the support brackets 60 are angled such that the connectors 68 on the exterior side 100, 100' of the panels 50, 50' are angled downwardly toward the base 12. (For purposes of this discussion, with reference to the figures, "down" and "up" refer to the base 12 being down and the apparatus extending upwardly from the base 12. It will be appreciated that in use, the apparatus can be placed in any desired orientation.)

A plurality of fanning clips 74 are secured to lower edges of the panels 50, 50' in order to retain the fibers 70 extending from the exterior connectors 68. The forward flange 32 is provided with a plurality of take-up spools 76 disposed in vertical linear alignment along flange 32 on an exterior surface thereof. Retaining clips 78 are also provided between the spools 76. Accordingly, excess length of fibers 70 may be passed within the retaining clips 78 and wrapped around the spools 76. A generally U-shaped trough 80 is provided secured to the support 24 to define an open trough 81 for passing fibers from panel 50 to panel 50' with any excess length of such passed fibers 70 being looped over the spools 76. To prevent the panels 50, 50' from swinging beyond a 90° open position, the angled first ends 52, 52' of the panels 50, 50' abut the clips 78 when the panel 50, 50' is at the 90° full open position to limit the degree of opening (as shown with respect to end 52 of panel 50 abutting clip 78 in FIG. 4).

A fiber optic bending limiter 90, 90' is provided on interior surfaces 102, 102' of the panels 50, 50' and the splice support 30. The limiter 90 is a flexible hollow tube with a first end secured to the splice tray support 30 and with a second end secured to the panel 50, 50' for movement therewith.

With the apparatus thus described, a plurality of fiber connectors 64 may be secured to the interior side of the adapters 62 and with pigtail lengths of fibers 66 passed through the bending limiter 90 and into the pathway 39 of the splice tray support 30. The pigtail fibers 66 may then be terminated within the splice tray 36. Similar passage of fibers may be accomplished on the opposite panel with the fibers attached to the splice tray 36' associated with the opposite panel 50'. Fibers (not shown) from fiber optic cables (not shown) admitted through the ports 16 may be passed around the pathway 39 of the splice tray support 30 and also terminated on the splice tray 36 to cause fiber optic connection between the fibers of the cables from the ports to the pigtail fibers 66 connected to the adapters 62 on the interior sides 102, 102' of panels 50, 50'. Accordingly, the panels 50 may then be moved to the closed position. It will be appreciated that as panels 50 are moved between opened and closed positions, the limiter 90 prevents the pigtail fibers 66 from being bent beyond a minimum bending radius of ¾ inch and further prevents the fibers 66 from being pinched in the space between the edges 52 and the flange 32. With the panels 50 pivoted to the closed position, cross-connect cables 70 may then be connected to the adapters 62 on the exterior surfaces 100, 100' of the panels 50, 50' and passed through the trough 81 to the adapters 62 of the opposite panel with any excess length of the cross connect cables 70 being taken up on the spools 76.

During typical use, it is anticipated that connection and splicing of the pigtails 66 to in-coming cables on the splice tray 36 occurs during initial setup with infrequent access required to make adjustments from time to time. Accordingly, after initial splicing of the pigtails 66 to the incoming fibers, the panels 50 are rotated to the closed position and most commonly left in the closed position. More frequently, it is desirable to reroute the cross-connect cables 70. Accordingly, the present invention protects the internal splicing which is infrequently accessed even though more frequent access may be made for rerouting the cross-connect cables 70.

Figure 4:
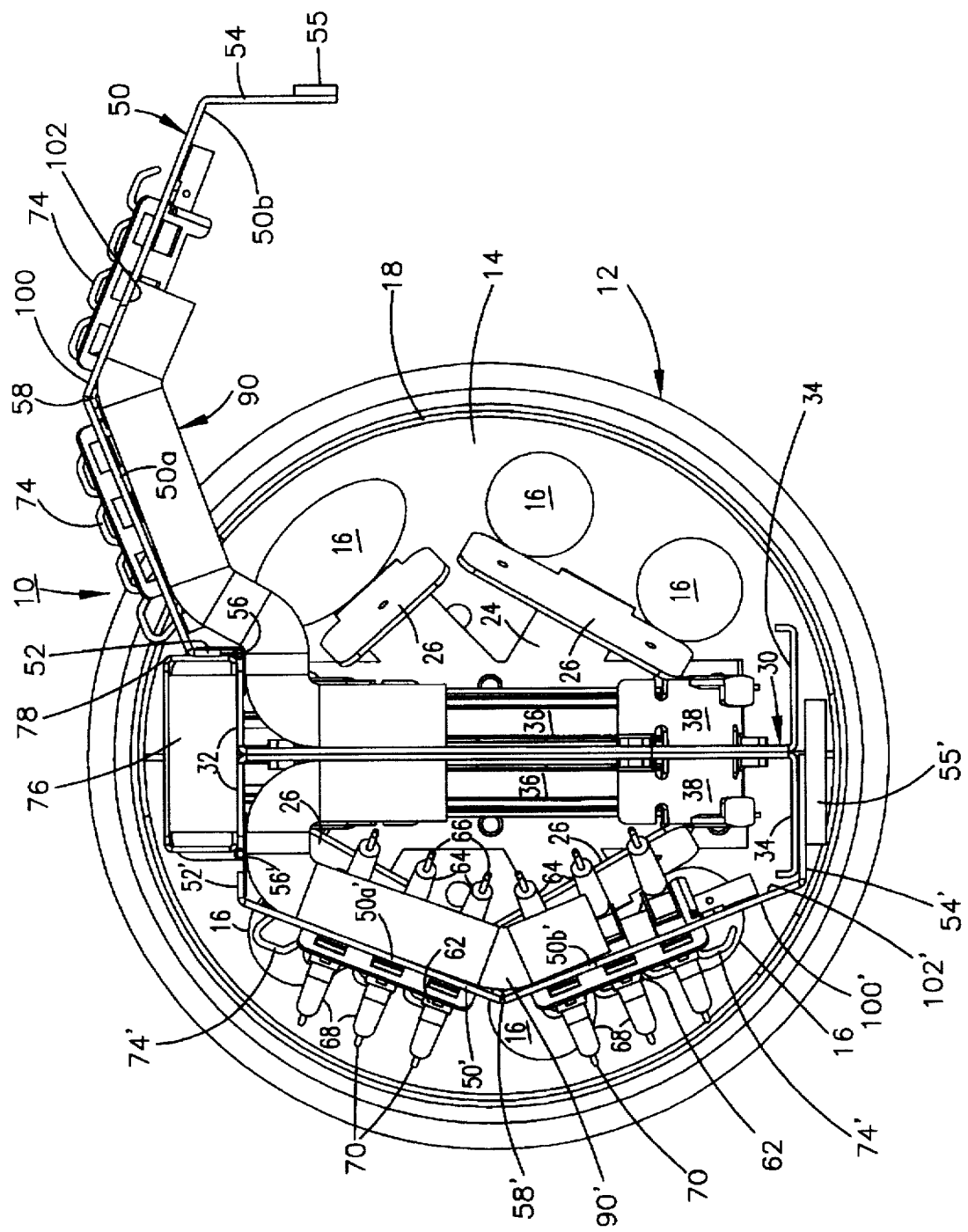
FIG. 4 is a top plan view of the apparatus of FIG. 1.

By providing the dividing line 58 between the angled planes or fields 50a, 50b, an increased density of adapters 62 is provided within the circular dimensions of the enclosure 18 as best shown in FIG. 4. Namely, by providing segmented or arcuate panels 50, 50', an increased surface area for adapters is provided which would otherwise be available with flat panels 50, 50'.

Having disclosed the present invention and the preferred embodiment, it will be appreciated that modifications and equivalence of the preferred concepts may occur to one skilled in the art. For example, the device 10 may be suitable for numerous applications where splicing is not required by removing the splice tray 36. As a result of such a modification, the apparatus 10 no longer has splice functions but has cross-connect functions and pathways for taking up fibers. If the splice tray 36 is removed, the adapters 62 on the interior surface 102, 102' are not connected to pigtails but are instead connected directly to the fibers entering the interior of the enclosure through the ports 16.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cross-connect apparatus for mounting in an enclosure having a base and a cover removably secured to said base, said cover having a predetermined longitudinal dimension and a predetermined cross-section normal to said longitudinal dimension, said apparatus comprising:

a base support having means for securing said base support to said base;

a first connector panel having a first end and a second end, said first end connected to said base support for said first connector panel to pivot at said first end relative to said base support about an axis generally parallel to said longitudinal dimension;

a second connector panel having a first end and a second end, said first end of said second connector panel connected to said base support for said second connector panel to pivot at said first end relative to said base support about an axis generally parallel to said longitudinal dimension;

each of said first and second connector panels including an interior surface and an exterior surface, said first and second connector panels secured to said base support with said interior surfaces opposing one another with a dividing plane separating said panels;

said first and second connector panels independently pivoting at said first ends between open and closed positions with said second ends of said panels moving away from said dividing plane when said panels move from said closed positions to said open positions;

a plurality of fiber optic adapters secured to each of said first and second connector panels for movement therewith, each of said adapters having means for securing a first plurality of fiber connectors with attached fibers to individual ones of said adapters on said interior surfaces and each of said adapters having means for securing a second plurality of fiber connectors with attached fibers to individual ones of said adapters on said exterior surfaces;

said base support and said panels dimensioned for said support and said panels to be completely received within said cover with said base support secured to said base and with said exterior surfaces spaced from internal surfaces of said cover when said panels are in said closed positions by a spacing greater than an extension of said second plurality of fibers and connectors from said exterior surfaces.

2. An apparatus according to claim 1 wherein said exterior surfaces are non-planar to define at least two fields separated by a dividing line spaced from said dividing plane a distance greater than a spacing of said first and second ends from said dividing plane when said panels are in said closed positions.

3. An apparatus according to claim 2 wherein said fields are planar.

4. An apparatus according to claim 1 further comprising a bending limiter for limiting bending of said fibers of said first plurality as said panels are moved between said open and closed positions.

5. An apparatus according to claim 4 wherein said bending limiter comprises a flexible guide having one end secured to said panel for movement therewith and a second end secured in a fixed position relative to said base support.

6. An apparatus according to claim 1 wherein said first ends of said first and second panels are disposed in close proximity and wherein said second ends of said first and second panels are disposed in close proximity when said panels are in said closed positions.

7. An apparatus according to claim 1 further comprising a splice tray support secured to said base support and positioned on said dividing plane, said splice tray support having a first and a second fiber splice tray secured thereto on opposite sides thereof with said first splice tray opposing said interior surface of said first panel and with said second splice tray opposing said interior surface of said second panel.

8. An apparatus according to claim 7 wherein said splice tray support includes first and second fiber guides surrounding each of said first and second splice trays, respectively, to define first and second fiber paths surrounding said first and second splice trays.

9. An apparatus according to claim 1 comprising a fiber take-up secured to said base support for retaining excess lengths of fiber and with said fiber take-up secured to said base support for said fiber take-up to be accessible when said panels are in said closed positions.

10. An apparatus according to claim 9 wherein said first ends of said panels are positioned in parallel, spaced-apart alignment, said fiber take-up disposed between said first ends.

11. An apparatus according to claim 10 wherein said fiber take-up includes a plurality of fiber spools disposed in linear alignment between said first ends.

12. A combination comprising:

(A) an enclosure having a base and a cover removably secured to said base, said cover having a predetermined longitudinal dimension and a predetermined cross-section normal to said longitudinal dimension;

(B) a cross-connect apparatus for mounting in an enclosure, said cross-connect apparatus having:

a base support having means for securing said base support to said base;

a first connector panel having a first end and a second end, said first end connected to said base support for said first connector panel to pivot at said first end relative to said base support about an axis generally parallel to said longitudinal dimension;

a second connector panel having a first end and a second end, said first end of said second connector panel connected to said base support for said second connector panel to pivot at said first end relative to said base support about an axis generally parallel to said longitudinal dimension;

each of said first and second connector panels including an interior surface and an exterior surface, said first and second connector panels secured to said base support with said interior surfaces opposing one another with a dividing plane separating said panels;

said first and second connector panels independently pivoting at said first ends between open and closed positions with said second ends of said panels moving away from said dividing plane when said panels move from said closed positions to said open positions;

a plurality of fiber optic adapters secured to each of said first and second connector panels for movement therewith, each of said adapters having means for securing a first plurality of fiber connectors with attached fibers to individual ones of said adapters on said interior surfaces and each of said adapters having means for securing a second plurality of fiber connectors with attached fibers to individual ones of said adapters on said exterior surfaces;

said base support and said panels dimensioned for said base support and said panels to be completely received within said cover with said base support secured to said base and with said exterior surfaces spaced from internal surfaces of said cover when said panels are in said closed positions by a spacing greater than an extension of said second plurality of fibers and connectors from said exterior surfaces.

13. A combination according to claim 12 further comprising a bending limiter for limiting bending of said fibers of said first plurality as said panels are moved between said open and closed positions.

14. A combination according to claim 13 wherein said bending limiter comprises a flexible guide having one end secured to said panel for movement therewith and a second end secured in a fixed position relative to said base support.

15. A combination according to claim 12 further comprising a splice tray support secured to said base support and positioned on said dividing plane, said splice tray support having a first and a second fiber splice tray secured thereto on opposite sides thereof with said first splice tray opposing said interior surface of said first panel and with said second splice tray opposing said interior surface of said second panel.

16. A combination according to claim 15 wherein said splice tray support includes first and second fiber guides surrounding each of said first and second splice trays, respectively, to define first and second fiber paths surrounding said first and second splice trays.

17. A combination according to claim 12 comprising a fiber take-up secured to said base support for retaining excess lengths of fiber and with said fiber take-up secured to said base support for said fiber take-up to be accessible when said panels are in said closed positions.

18. A combination according to claim 17 wherein said first ends of said panels are positioned in parallel, spaced-apart alignment, said fiber take-up disposed between said first ends.

19. A combination according to claim 18 wherein said fiber take-up includes a plurality of fiber spools disposed in linear alignment between said first ends.

* * * * *